US011817706B2

(12) United States Patent
Rajagopal et al.

(10) Patent No.: US 11,817,706 B2
(45) Date of Patent: Nov. 14, 2023

(54) SYSTEM AND METHOD FOR TRANSACTIVE ENERGY MARKET

(71) Applicant: Tata Consultancy Services Limited, Mumbai (IN)

(72) Inventors: Narayanan Rajagopal, Bangalore (IN); Yogesh Kumar Bichpuriya, Pune (IN); Sumit Kumar Ray, Kolkata (IN); Aashutosh Kumar Soni, Kolkata (IN); Subrata Indra, Kolkata (IN); Subham Kumar, Kolkata (IN); Vishnu Padmakumar Menon, Pune (IN); Smita Lokhande, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 386 days.

(21) Appl. No.: 17/203,817

(22) Filed: Mar. 17, 2021

(65) Prior Publication Data

US 2021/0296896 A1     Sep. 23, 2021

(30) Foreign Application Priority Data

Mar. 20, 2020   (IN) .............................. 202021012229

(51) Int. Cl.
*H02J 3/00* (2006.01)
*G06Q 30/08* (2012.01)

(52) U.S. Cl.
CPC .............. *H02J 3/008* (2013.01); *H02J 3/003* (2020.01); *H02J 3/004* (2020.01); *G06Q 30/08* (2013.01)

(58) Field of Classification Search
CPC ............ H02J 3/008; H02J 3/003; H02J 3/004; G06Q 30/08; Y04S 50/10
See application file for complete search history.

(56) References Cited

U.S. PATENT DOCUMENTS

| | | | | |
|---|---|---|---|---|
| 7,599,866 | B2* | 10/2009 | Yan ...................... | G06Q 20/102 |
| | | | | 705/37 |
| 8,386,369 | B2* | 2/2013 | Warnick ................. | G06Q 50/06 |
| | | | | 705/37 |
| 9,129,337 | B2* | 9/2015 | Chassin ................. | G06Q 50/06 |
| 11,159,044 | B2* | 10/2021 | Lian ........................ | H02J 3/381 |
| 2010/0217642 | A1* | 8/2010 | Crubtree ................ | G06Q 10/00 |
| | | | | 726/4 |

(Continued)

OTHER PUBLICATIONS

Faqiry et al., "Transactive Energy Auction with Hidden User Information in Microgrid," Computer Science (2016).

(Continued)

*Primary Examiner* — Ziaul Karim
(74) *Attorney, Agent, or Firm* — Finnegan, Henderson, Farabow, Garrett & Dunner LLP (57) ABSTRACT

This disclosure relates generally to a system and method for transactive energy (TE) market model. Existing TE models either consider market without a network simulation model or both the market model and the network simulation model are considered in a single formulation which makes the computation complex. The disclosed system considers both the power flow simulation of the network and the market model in a sequence. In other words, the disclosed system decouples the market model and network model to reduce the computational complexity at the same time without sacrificing on the technical feasibility of the solution.

7 Claims, 9 Drawing Sheets

(56) References Cited

U.S. PATENT DOCUMENTS

| | | | |
|---|---|---|---|
| 2010/0218108 A1* | 8/2010 | Crabtree | G06Q 50/06 |
| | | | 715/738 |
| 2011/0060476 A1* | 3/2011 | Iino | G06F 1/3203 |
| | | | 700/297 |
| 2012/0271686 A1* | 10/2012 | Silverman | G06Q 30/02 |
| | | | 705/14.1 |
| 2016/0077507 A1 | 3/2016 | Sheble | |
| 2021/0296897 A1* | 9/2021 | Cruickshank, III | H02J 9/06 |

OTHER PUBLICATIONS

Ghorani et al., "Optimal Bidding Strategy of Transactive Agents in Local Energy Markets," IEEE Transactions on Smart Grid (2018).
Kabiri et al., "Optimal Transactive Market Operations With Distribution System Operators," IEEE Transactions on Smart Grid (2017).
Khorasany et al., "Auction Based Energy Trading in Transactive Energy Market with Active Participation of Prosumers and Consumers," Australasian Universities Power Engineering Conference (AUPEC) (2017).
Pinto et al., "Decision Support for Small Players Negotiations Under a Transactive Energy Framework," IEEE Transactions on Power Systems, 34(5): 4015-4023 (2019).

* cited by examiner

SYSTEM AND METHOD FOR TRANSACTIVE ENERGY MARKET

PRIORITY CLAIM

This U.S. patent application claims priority under 35 U.S.C. § 119 to: India Application No. 202021012229, filed on Mar. 20, 2020. The entire contents of the aforementioned application are incorporated herein by reference.

TECHNICAL FIELD

The disclosure herein generally relates to a transactive energy framework, and, more particularly, to system and method for transactive energy market.

BACKGROUND

The growing importance of distributed energy resources (DER) in the electricity distribution system has effectively democratized energy. The erstwhile consumers of electricity are now able to generate enough energy to fulfil not just their own needs but also sell the surplus back to grid or their neighbors. In one implementation the DER are modelled in a transactive energy framework (TEF).

TEF can help in utilizing the flexibility of demand by sending a transactive signal—taking into consideration willingness and preferences of prosumers to derive such a signal. The entire ecosystem is analogous to a retail electricity market where participants submit their demand and supply bids. The distribution system operator (DSO) matches these bids to clear the market and find a market-clearing price. Each participant can then compare this market-clearing price with its bid price and act accordingly. In a typical TE model, these participants could be prosumers or the devices.

SUMMARY

Embodiments of the present disclosure present technological improvements as solutions to one or more of the above-mentioned technical problems recognized by the inventors in conventional systems. For example, in one embodiment, a processor implemented method for transactive energy market associated with a distribution network is provided. The method includes acquiring, by a market model, a demand-side bid information associated with one or more demand-side bids and a supply side bid information associated with one or more supply side bids in the form of price-quantity in real-time in a transactive energy environment via one or more hardware processors. A demand-side bid from amongst the one or more demand-side bids is acquired from at least one price responsive and transactive load in the distribution network. Also, a supply-side bid from amongst the one or more supply-side bids is acquired from one or more energy resources for providing supply of electricity in the distribution network. Further, the method includes optimizing, by the market model, the demand side bid and the supply side bid using an optimization function to obtain a market clearing price (MCP) for the at least one price responsive and transactive load, via the one or more hardware processors. Also, the method includes analyzing, by a network simulation model, the MCP along with a network data to obtain a state information associated with the distribution network, via the one or more hardware processors.

In another aspect, a system for transactive energy market associated with a distribution network is provided. The system includes one or more memories; and one or more hardware processors, the one or more memories coupled to the one or more hardware processors, wherein the one or more hardware processors are configured to execute programmed instructions stored in the one or more memories, to acquire, by a market model, a demand-side bid information associated with one or more demand-side bids and a supply side bid information associated with one or more supply side bids in the form of price-quantity in real-time in a transactive energy environment, wherein a demand-side bid from amongst the one or more demand-side bids is acquired from at least one price responsive and transactive bad in the distribution network, further wherein a supply-side bid from amongst the one or more supply-side bids is acquired from one or more energy resources for providing supply of electricity in the distribution network. Further, the one or more hardware processors are configured by one or more hardware processors to optimize, by the market model, the demand side bid and the supply side bid using an optimization function to obtain a market clearing price (MCP) for the at least one price responsive and transactive bad. Furthermore, analyze, by a network simulation model, the MCP along with a network data to obtain a state information associated with the distribution network, via the one or more hardware processors.

In yet another aspect, a non-transitory computer readable medium for method for transactive energy market associated with a distribution network is provided. The method includes acquiring, by a market model, a demand-side bid information associated with one or more demand-side bids and a supply side bid information associated with one or more supply side bids in the form of price-quantity in real-time in a transactive energy environment via one or more hardware processors. A demand-side bid from amongst the one or more demand-side bids is acquired from at least one price responsive and transactive bad in the distribution network. Also, a supply-side bid from amongst the one or more supply-side bids is acquired from one or more energy resources for providing supply of electricity in the distribution network. Further, the method includes optimizing, by the market model, the demand side bid and the supply side bid using an optimization function to obtain a market clearing price (MCP) for the at least one price responsive and transactive load, via the one or more hardware processors. Also, the method includes analyzing, by a network simulation model, the MCP along with a network data to obtain a state information associated with the distribution network, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

The growing importance of distributed energy resources (DER) in the electricity distribution system has effectively democratized energy. The erstwhile consumers of electricity, in avatar of prosumers, are now able to generate enough energy to fulfil not just their own needs but also sell the surplus back to grid or their neighbors. Hence, large number of players participates in the retail markets as compared to wholesale electricity markets.

With evolving DERs, the management of power distribution networks is becoming more difficult than before, mainly due to high electricity demand and large penetration of DERs including renewables. The DERs make the demand and supply both less predictable, so, real time or near real time network state has to be monitored using load flow simulation tool. Also, the distribution system typically has unbalanced three phases and requires three phase load flow simulation tools for accurate system state determination.

In a transactive energy (TE) framework, market and control mechanisms are required to coordinate to dynamically balance the demand and supply. In the TE framework, participants submit their demand and supply bids. The distribution system operator (DSO) matches these bids to clear the market and finds a market-clearing price. Each participant can then compare the market-clearing price with own bid price and act accordingly. In a typical TE model, these participants could be prosumers or the devices. With millions participating in a distribution grid, it is important to have a scalable TE model, smart devices, and sophisticated control systems to run the system within technical limits.

In a typical TEE, an ideal way to dynamically balance the demand and supply is by using Locational marginal pricing model (LMP) for distribution system using AC-OPF (AC optimal power flow), as shown in the formulation below:

$$\text{Maximize } SN(x, u) = \sum_{j=1}^{N_j} B_j(d_j) - \sum_{h=1}^{N_h} C_h(g_h)$$

Subject to:
Power balance at each bus $$P_k^G - P_k^L = \sum_{i=1}^{N_{bus}} V_k V_i [G_{ki}\cos(\theta_k - \theta_i) + B_{ki}\sin(\theta_k - \theta_i)]$$

$$Q_k^G - Q_k^L = \sum_{i=1}^{N_{bus}} V_k V_i [G_{ki}\sin(\theta_k - \theta_i) + B_{ki}\cos(\theta_k - \theta_i)]$$

Active and reactive power constraints $$P_b^{min} \leq P_b \leq P_b^{max}$$

$$Q_b^{min} \leq Q_b \leq Q_b^{max}$$

Voltage level constraints at each bus $$V_i^{min} \leq V_i \leq V_i^{max}$$

Thermal limits of wires and transformers $$S_z - S_z^{max} \leq 0$$

where B(d) is bid function of demand/buyer j and C(g) is the cost function of the generator/seller, h.
$P^G$ generator at bus k
$P^L$ load at bus k
$V_k$ is the voltage at bus K
$\theta_k$ is the voltage angle at bus K
$G_{ki}$ and $B_{ki}$ are the line parameters
$S_z$ Thermal loading of wires and transformers However, the aforementioned LMP approach involving solving a non-linear optimization problem with large number of variables may not be adaptable in practice. Linear approximations like DC-OPF may compromise with the loss and reactive power information which is important from a distribution system point of view. Other existing approaches are based on only market simulation and neglect or simplify the network modeling at the cost of accurate network state information.

An efficient model for implementing TEF should have a scalable solution, market model to facilitate the transaction of electricity, a transactive controller, power flow simulation, and a fast computational model. However, most of the existing models are either focused on only some of the aforementioned features or too complex to implement in practice.

The disclosed embodiments provide method and system for transactive energy market. The disclosed system decouples the network model with the market model and considers both the power flow simulation of the network and the markets mechanism in sequence. Existing models either considers market mechanism without the network simulation or both are considered in a single formulation which makes the computation complex. Unlike the conventional models, the disclosed system decouples the market model and network model to reduce the computational complexity at the same time without sacrificing on the technical feasibility of the solution.

In the decoupling of the market model and network model, firstly the market model is run with simplified network connections (in the form of incidence matrix) constraint. This is also referred to as transportation modelling of a network. The transportation modelling of the network helps in reducing the complexity due to network modelling and can be solved efficiently for large networks. However, the output schedule (of generation and demand) from the decoupled market model may violate some of the network parameter/constraints like line capacities, voltage limits and so on. So, in a next iteration of running the market model, the market model takes into account those specific constraints and/or network parameters that are violated by appropriately including them and obtains a new schedule. In certain scenarios, the iterative process of considering in a current iteration those constraints and/or network parameters that are violated in a previous iteration may be repeated for a number of iterations before finally converging to a schedule, which may be valid from market as well as network points of view.

Exemplary embodiments are described with reference to the accompanying drawings. In the figures, the left-most digits) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 5H, where similar reference characters denote corresponding features consistently throughout the figures, there are shown preferred embodiments and these embodiments are described in the context of the following exemplary system and/or method.

Figure 1:
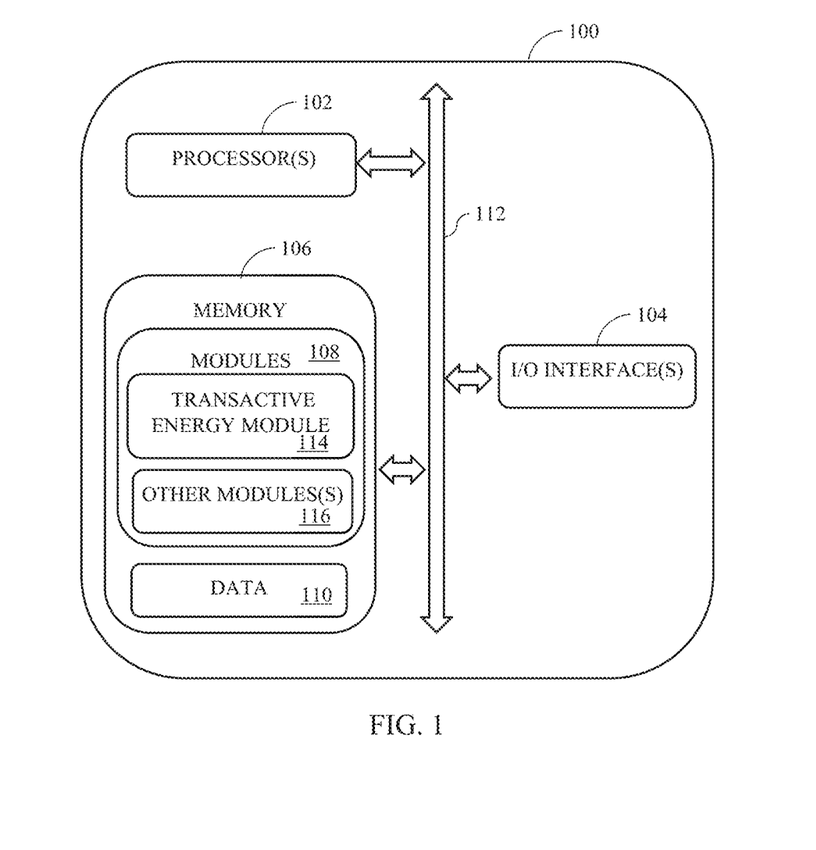
FIG. 1 illustrates a block diagram of a system implementing transactive energy market associated with a distribution system, in accordance with an implementation of the present subject matter.

FIG. 1 illustrates a block diagram of a system 100 implementing transactive energy market associated with a distribution network, in accordance with an implementation of the present subject matter. The system 100 may embody a retail market model in an electricity distribution network under the transactive energy framework. The market model may enable the participants in the market to trade electricity. The participants in the market may include, but are not limited to, prosumers, consumers, appliances, aggregators, distribution system operator, retailers, and so on.

The system 100 may be implemented in a computing device. Examples of the computing device include, but are not limited to, mainframe computers, workstations, personal computers, desktop computers, minicomputers, servers, multiprocessor systems, laptops, a cellular communicating device, such as a personal digital assistant, a smart phone, and a mobile phone; and the like. The system 100, implemented using the computing device, includes one or more hardware processor(s) 102, IO interface(s) 104, and a memory 106 coupled to the processor 102. The processor 102 can be a single processing unit or a number of units. The hardware processor 102, the memory 106, and the IO interface 104 may be coupled by a system bus such as a system bus 112 or a similar mechanism. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 106.

Functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or customized, may also be included.

The IO interfaces 104 may include a variety of software and hardware interfaces, for example, interface for peripheral device(s), such as a keyboard, a mouse, an external memory, and a printer. Further, the IO interfaces 104 may enable the computing device to communicate with other computing devices, such as a personal computer, a laptop, and like.

The memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 106 may also include module(s) 108 and data 110.

The modules 108 may include routines, programs, objects, components, data structures, and so on, which perform particular tasks or implement particular abstract data types. The modules 108 may include programs or computer-readable instructions or coded instructions that supplement applications or functions performed by the system 100. The modules 108 may also be used as, signal processor(s), state machine(s), logic circuitries, and/or any other device or component that manipulates signals based on operational instructions. Further, the modules 108 can be used by hardware, by computer-readable instructions executed by the one or more hardware processors 102, or by a combination thereof. In an embodiment, the modules 108 can include various sub-modules and other module(s) 116. The other module(s) 116 may include programs or coded instructions that supplement applications and functions of the computing device.

The data 110, amongst other things, serves as a repository for storing data processed, received, and generated by one or more of the module(s) 108. The data 110 includes, for example, transactive energy market data associated with strategies and techniques, and other data. The other data includes data generated as a result of the execution of one or more modules in the other module(s).

According to an implementation of the present subject matter, systems and methods for transactive energy market operable in a transactive energy environment are described. The transactive energy environment includes at least one price responsive and transactive load and the one or more energy resources. An example of the transactive energy environment in conjunction with a method for transactive energy market is illustrated and explained further with reference to FIGS. 2 and 3.

Figure 2:
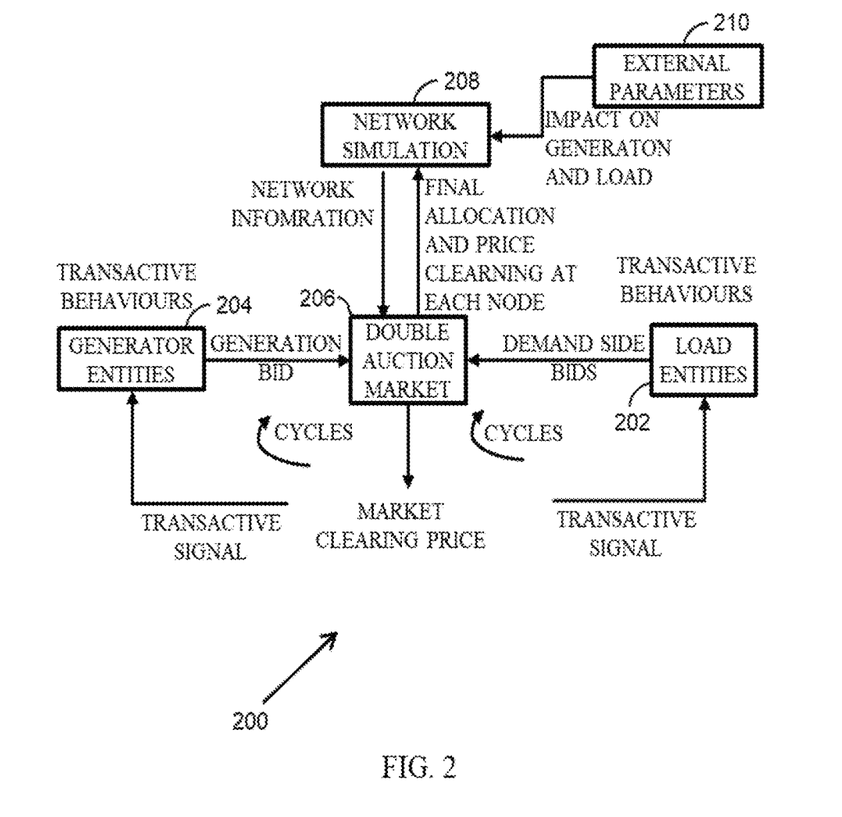
FIG. 2 illustrate an example representation of a transactive energy environment, in accordance with an example embodiment of the present disclosure.
Figure 3:
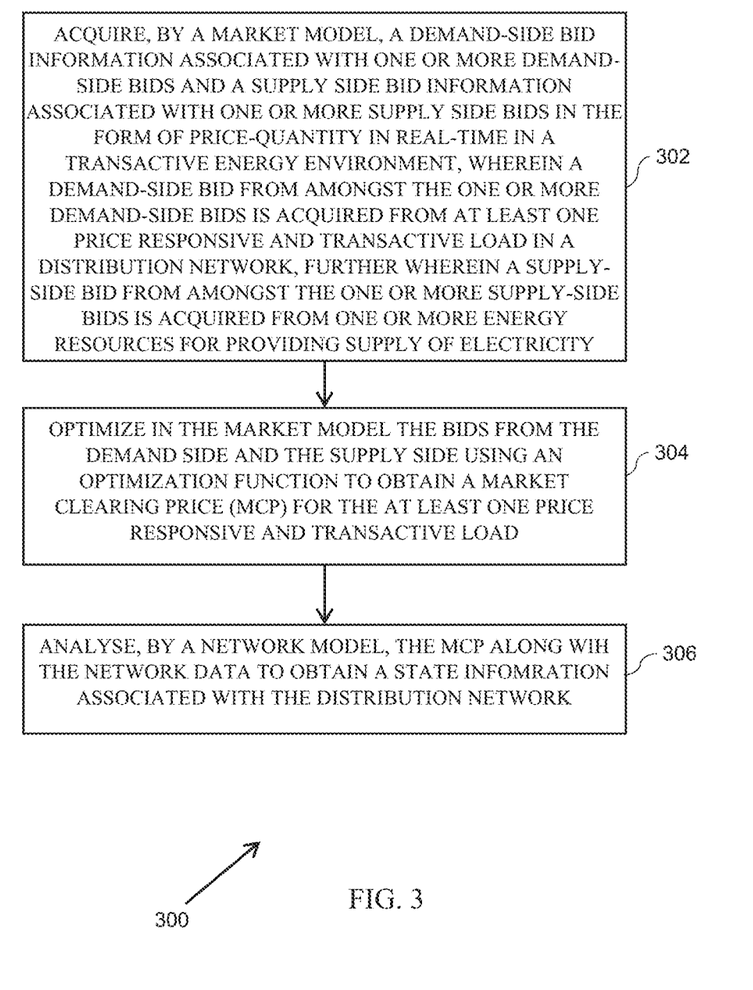
FIG. 3 is a flow diagram illustrating a method for transactive energy market, in accordance with some embodiments of the present disclosure.

Referring collectively to FIGS. 2-3, FIG. 2 illustrate an example representation of a transactive energy environment associated with the distribution network, in accordance with an example embodiment of the present disclosure. FIG. 3 illustrates an example flow diagram of a method 300 for transactive energy market in accordance with embodiments of the present disclosure. The method 300 depicted in the flow chart may be executed by a system, for example, the system, 100 of FIG. 1. In an example embodiment, the system 100 may be embodied in a computing device. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 100. However, the operations of the method 300 can be described and/or practiced by using any other system.

Referring to FIG. 2 the transactive energy environment includes at least one price responsive and transactive load (represented by load entities), for example a load 202 and the one or more energy resources (represented by generator entities), for example a resource 204. A market model, for example a market model 206 acquires a demand-side bid information associated with one or more demand-side bids and a supply side bid information associated with one or more supply side bids in the form of price-quantity in real-time in the transactive energy environment 200, at 302 of method 300. In one embodiment, the market model 206 implemented herein is a double-auction market wherein both the demand side and the supply side participate and places respective bids and/or offers. Said bids may be in the form of a price-quantity pair bid for each time interval. From the demand side, the demand side bid may be acquired from any price responsive/transactive load(s) (e.g., thermostatic load) in the market. Similarly, the supply side bid may be acquired from one or more energy resources for providing supply of electricity. In an embodiment, the one or more energy resources may include, but are not limited to, a substation power and any other distributed energy resource (e.g., roof-top solar PV, battery, and so on). In an example of HVAC loads, the bids may depend on customer requirements and comfort, weather, and so on whereas supply offers depend on availability of generation. Demand side bids from the demand side consists of the transactive loads in the houses at the distribution end.

The supply side bids, and the demand side bids may be placed automatically by the devices based on a pre-set logic. Herein, the pre-set logic may include conditions (such as, bid price etc.) set/input by the market participants into the associated hardware/software (e.g., home energy manager or similar devices) with the help of a user interface. Examples of devices incorporating such hardware/software for setting/inputting logics may include raspberry pi devices or any such device capable of automation using intelligent electronic devices.

An aggregator may aggregate the bids by small market participants and can participate in the market on behalf of small market participants. In an embodiment, the aggregator may be embodied in the Generator/Load Entities 204. An aggregator helps in aggregating small generator/load entities and acts on their behalf. Aggregator thus helps in reducing the complexity of system by minimizing the infrastructure required by the small entities (in terms of their energy consumption) to enable transactive energy framework. The market operator gathers all the bids and run a market clearing model to obtain a market cleared price (MCP). Herein, the market operator may include a hardware and/or software system, also known as market clearing and settlement system that may be owned and managed by an entity, for instance, a power exchange.

At 304, method 300 includes optimizing, by the market model, the bids from the demand side and the supply side using an optimization function to obtain a market clearing price (MCP) for the at least one price responsive and transactive load.

In an example embodiment, the optimization function may be a social welfare maximization function (i.e. sum of load entities' surplus and generation entities' surplus), as represented by equations below. The Lagrange multiplier of eqn. (3) below gives the MCP. In other words, the MCP can be determined by solving the following optimization problem:

$$\max \sum_n \left( \sum_j P_{nj}^t X\ D_{nj}^t - \sum_j C_{ni}^t X\ S_{ni}^t \right)$$

Such that:

$$0 \leq D_{nj}^t \leq D_{nj}^{t^{max}} \forall n,j \quad (1)$$

$$0 \leq S_{nj}^t \leq S_{nj}^{t^{max}} \forall n,j \quad (2)$$

$$\Sigma_n(\Sigma_j D_{nj}^t - \Sigma_j S_{ni}^t) = 0 \quad (3)$$

$$\Sigma_n(\Sigma_j D_{nj}^t = \Sigma_{b \in B_n} f_b^t \forall n \quad (4)$$

$$f_b^{min} \leq f_b \leq f_b^{max} \quad (5)$$

$$t \in \{1,2,\ldots,24\}$$

where,
n Number of nodes
i Number of steps in generation side bids
j Number of steps in generation side bids
$S_{ni}$ Bid of generator n at step i
$D_{nj}$ Bid of demand n at step j
$S_{ni}^{max}$ Maximum capacity limit of generator n at step i
$D_{ni}^{max}$ Maximum demand limit of generator n at step
$f_{ni}^{max}$ Maximum demand limit of transmission line b
$f_{ni}^{min}$ Minimum capacity limit of transmission line b Herein, the double-auction market is simulated separately from network simulation. The bids of each participant and network information is used for simulating the market model (double-auction market) which gives the market cleared price (MCP) and market cleared quantity (MCQ) of each participant. The MCP is then used for deciding energy supply (e.g., the state of HVAC units) to each consumer or demand unit.

The market cleared price (MCP) from the market model may be input to a network model as a transactive signal. At 306, a network simulation model analyzes the MCP along with a network data to obtain a system state information. For example, network model at network simulation 208 verifies technical feasibility of the output of the market model. In an example scenario, if the MCP greater than or equal to the bid price, the bid quantity may be cleared which means the load (for instance, HVAC load) can be switched on. If, however the MCP is less than the bid price, the bid quantity may not be cleared which means that the load (for example, the HVAC units) needs to be shut off. The state of the every transactive load, for instance, On/Off state is then passed as network data for power flow simulation. Herein, the network data may include the total demand of the distribution network, generation in the distribution network and connectivity (for example, via distribution lines) of each equipment of distribution network.

The power flow simulation helps in analyzing state information of the distribution network by using the network data. In an embodiment, the state information of the distribution network may include, but is not limited to, voltage at different substations in the distribution network, loading of the lines, active and reactive power consumption, losses, and so on. Herein, it will be noted that various external parameters such as weather conditions and so on, can affect the demand as well as renewable energy generation. Hence, the effect of eternal parameters 210 is considered in network simulation 208.

Example Scenario

Figure 4:
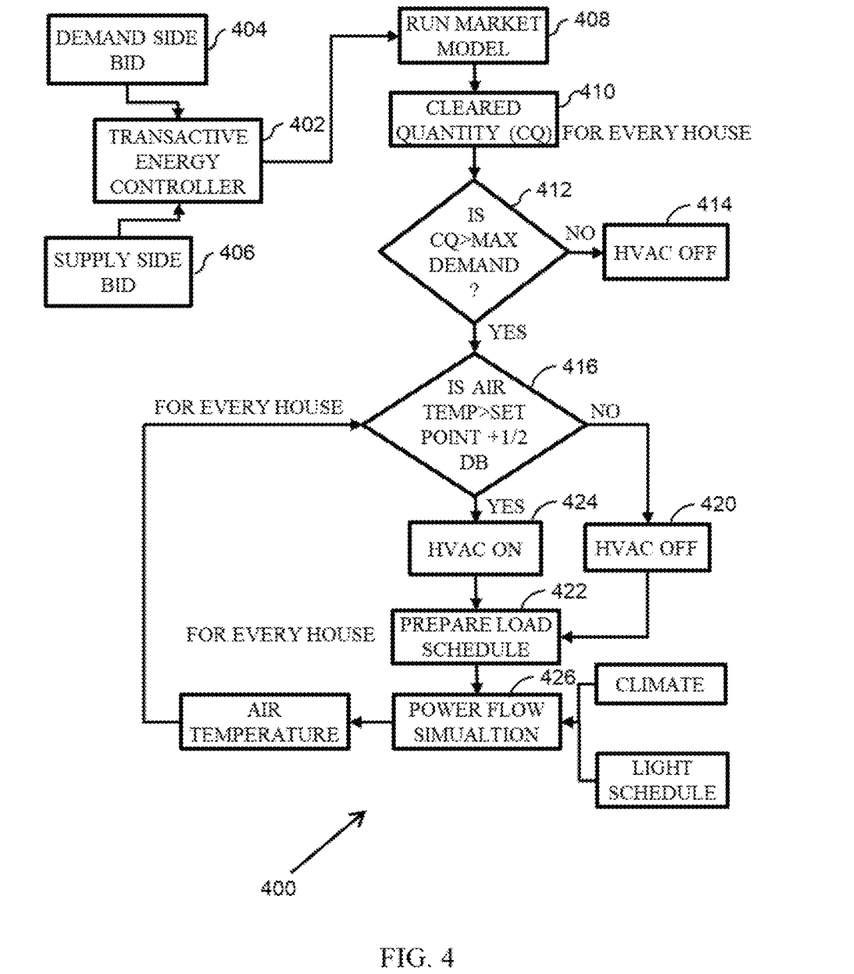
FIG. 4 illustrates an example flow diagram representing transactive energy model for heating ventilation and air conditioning (HVAC) load, in accordance with an example embodiment, of present disclosure.
Figure 5A:
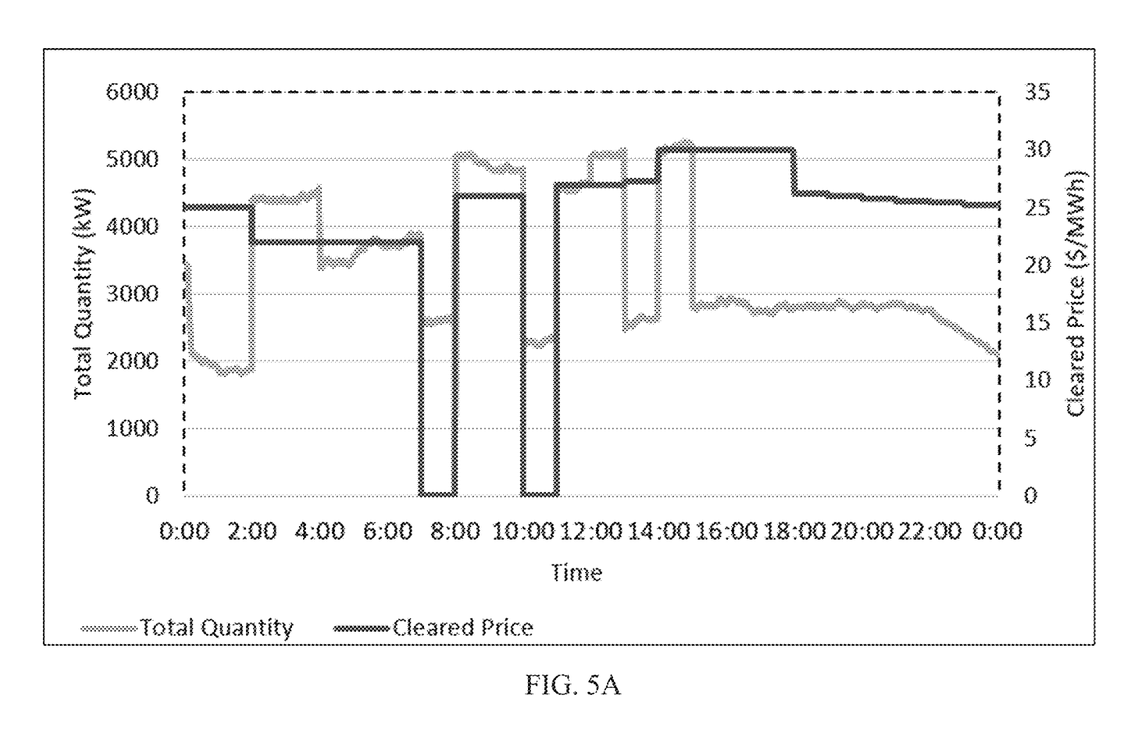
FIGS. 5A-5H illustrates experimental results for the transactive energy market model described with reference to FIGS. 1-4, in accordance with an example embodiment.

An example of implementation of the disclosed system and method for transactive energy market is described further with reference to FIGS. 4-5H below. Particularly, FIG. 4 illustrates an example flow diagram representing transactive energy model for HVAC load, in accordance with an example embodiment, of present disclosure. For instance, a transactive energy (TE) controller 402 takes demand bid 404 and supply bid 406 as inputs and compares the two. The TE controller can also take additional inputs, including, but not limited to, temperature, comfort settings and so on to take a control action. Based on the comparison, the TE controller can decide to change the state (on/off) or consumption/supply of the device/generator. For example, the TE controller may cause the market model to run (at 408) and compute cleared quantity (CQ) (at 410) for every demand location (for instance, each house in a geographical area). At 412, the TE controller may determine whether the computed CO is greater than the maximum demand or not. If it is determined at 412 that the CO is not greater than the maximum demand, then the HVAC is maintained at off state at 414. If, however at 412 it is determined that the CO is greater than the maximum demand, then at 416 it is determined, based on a pre-set logic whether the air temperature is greater than set point+½ deadband. If it is determined at 416 that the air temperature is not greater than set point+½ deadband, then at 420 the HVAC is maintained at an off state, and a load schedule is prepared for every house at 422. If, however at 416 it is determined that the air temperature is greater than set point+½ db, then at 424 the HVAC is switched on, and a load schedule is prepared for every house at 422. The load schedule along with climate information and light schedule are utilized for power flow simulations at 426. Herein, it should be understood that in various applications, the setpoint may be any temperature value that can be determined or fixed as per the application requirements and is not limited to the setpoint described in aforementioned example. For example, a user may want to switch on AC if temperature is more than 26 degree Celsius. Also, deadband refers to a span between the switching on of an AC and a change in the air temperature.

In the example scenario, the disclosed transactive energy model is illustrated by taking an example of price responsive HVAC as a transactive load in an IEEE 8500 Node System. The IEEE 8500 network has unbalanced nodes and consists of three-phase as well as single-phase nodes. The network was modified by aggregating the loads at single-phase nodes up to the three-phase nodes for sake of simplicity (however, the idea can be applied to a network with single phase nodes also), assuming a balanced network. The parameters recorded at node or house levels were aggregated to the three-phase node level. These loads and solar PV are aggregated to form 649 three phase nodes. The truncated network representation is shown in FIG. 5A.

The market model takes bid information (supply side bid information and demand side bid information) and calculates market clearing price and sends this as a TE signal to all market participants. The TE controller compares the bid price with the market price and changes the state of the device accordingly. Herein certain assumptions were, a) The fixed loads considered are ZIP loads whose schedule is defined for every time block; b) Price responsive loads considered were thermostat loads (heating and cooling mode); c) The thermostat settings like thermostat dead band, heating and cooling setpoints were considered same for all houses; d) The bids of the solar and substation generator are in similar range. In other words, the prices offered by solar PV connected at the consumer end are not very high or low as compared to the substation generator's price offer which provides all generators a competitive advantage.

Figure 5B:
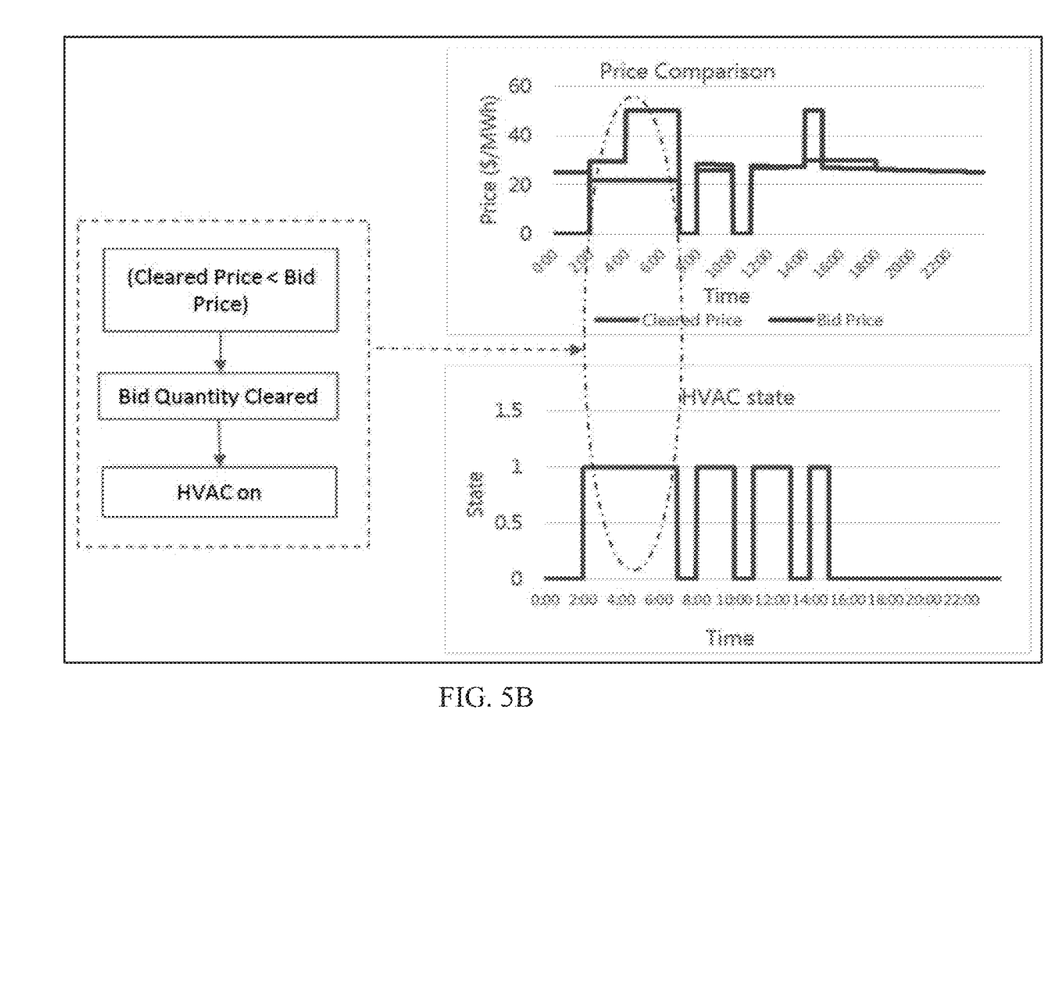
Figure 5C:
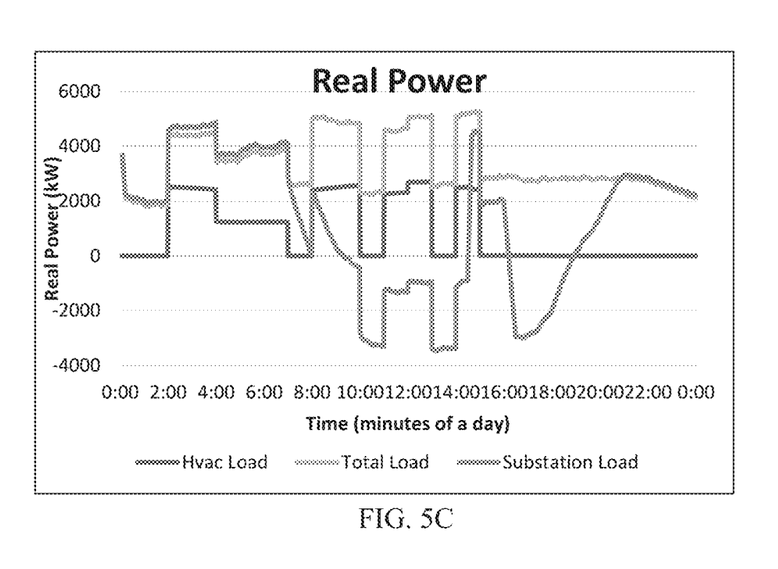

The plot in FIG. 5B represents the market clearing for the entire day. It can be seen that the quantity cleared decreases when there is significant increase in the Market Clearing Price (MCP). This decrease is dominantly evident in the evening hours. The period between 7:00 to 8:00 and 10:00 to 11:00 it is observed that the MCP is zero. This because during this period, none of the HVAC load bids into the market which results in no market clearing. The quantity cleared during this period is only of the essential load and does not include any HVAC load. As the bids for solar and substation generation are set in the same range, it is observed that the MCP is high in some cases when solar is available.

Every controller bid in the market in the form of price-quantity pair. For every controller, the load was categorized in two types, namely, fixed load (which needs to be ON irrespective of the price) and variable load (which is flexible and responsive to the price). HVAC was considered under variable type. The quantity bid was formed by summation of these two load types. After market clearing, if the price bid by the controller is determined to be higher than the clearing price, its corresponding quantity gets cleared, which means it can switch on its variable plus fixed load, else only the fixed load will be supplied FIG. 5C). As seen from FIG. 5D for 2:00 to 8:00, the cleared price is less than the bid price, which means the entire quantity bid by that controller was cleared which will enable the HVAC load.

Figure 5D:
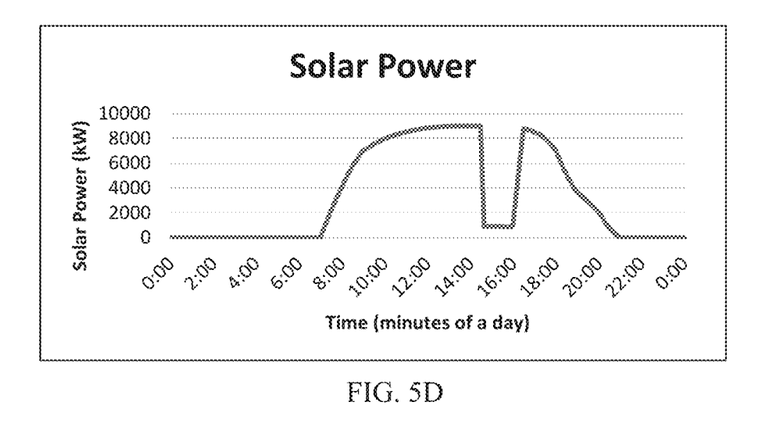
Figure 5E:
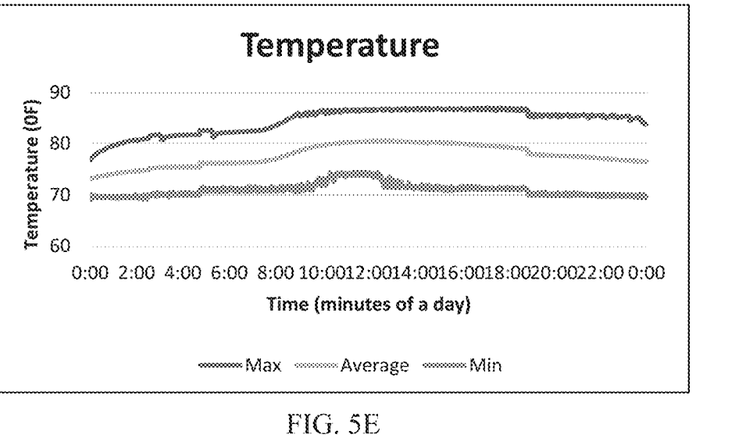
Figure 5F:
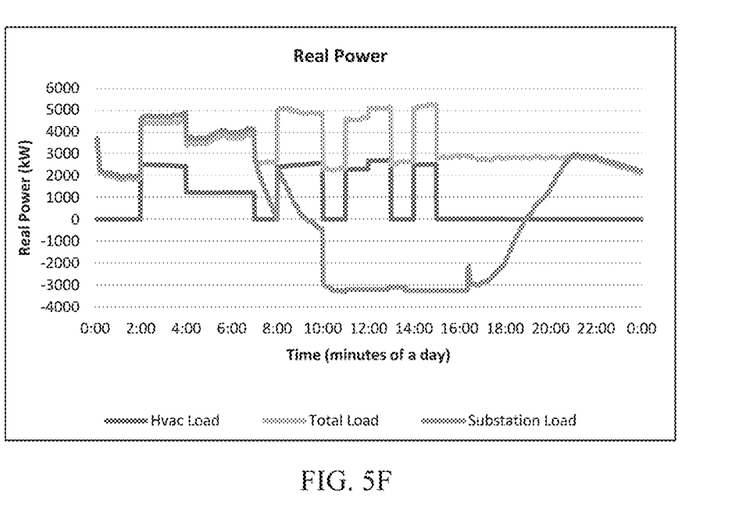
Figure 5G:
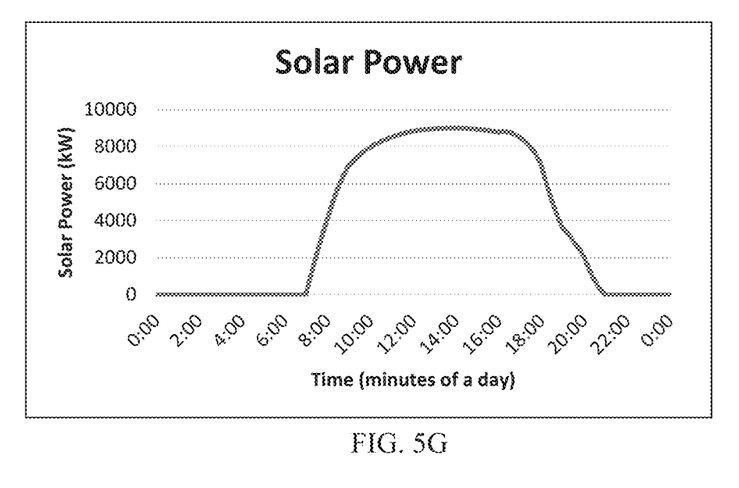
Figure 5H:
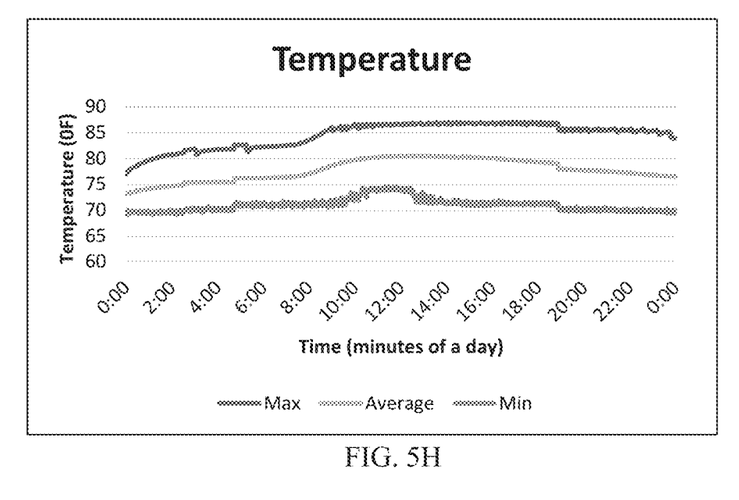

FIG. 5D shows the substation power, total house load and total HVAC load of all houses in cloudy scenario. As the HVAC loads are controlled, there are instances in which HVAC loads are completely off, thus resulting in the pattern as shown. In case of cloudy weather, the substation power is more during the instance 14:00 to 16:00 when cloud cover is present. Substation power is less and flat during sunny weather during this period as shown in FIG. 5G, as most of the loads are supplied by solar. FIG. 5F and FIG. 5H shows the minimum, average and maximum temperature of all houses. It can be seen that the average temperature of all houses lies within 23 C to 27 C (73 F and 81 F), FIGS. 5D to 5H are plotted for every five minutes in a day when market is cleared.

For the sunny weather scenario, there is continuous solar irradiance in the afternoon. Due to this, it can be seen that the power supplied by the substation decreases during the same period. For the cloudy weather scenario, due to cloud cover for the period 14:00 to 16:00 hour, there is zero solar power. Hence a sudden increase in the substation power during the same period was observed.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for transactive energy market. In an embodiment, the disclosed system considers both the power flow simulation of the network and the markets mechanism in sequence unlike conventional models where either market is considered without the network simulation or both market and network simulations are considered in a single formulation which makes the computation complex. In other words, the disclosed system decouples the market model and network model to reduce the computational complexity at the same time without sacrificing on the technical feasibility of the solution.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing", and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an" and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for transactive energy market associated with a distribution network, comprising:
    acquiring, by a market model, a demand-side bid information associated with one or more demand-side bids and a supply side bid information associated with one or more supply side bids in form of price-quantity in real-time in a transactive energy environment via one or more hardware processors, wherein a demand-side bid from amongst the one or more demand-side bids is acquired from at least one price responsive and transactive load in the distribution network, further wherein a supply-side bid from amongst the one or more supply-side bids is acquired from one or more energy resources for providing supply of electricity in the distribution network;
    optimizing, by the market model, the demand side bid and the supply side bid using an optimization function to obtain a market clearing price (MCP) for the at least one price responsive and transactive load, via the one or more hardware processors;
    analyzing, by a network simulation model, the MCP along with a network data to obtain a state information associated with the distribution network, via the one or more hardware processors, wherein the network data comprises a total demand of the distribution network, generation in the distribution network and connectivity via distribution lines of each equipment of the distribution network, and wherein the state information of the distribution network comprises voltage information at different substations in the distribution network, loading information of the distribution lines, and information on active and reactive power consumption and losses;
    determining, by the market model, whether the MCP of at least one participant of the plurality of market participants is greater than a maximum demand, via the one or more hardware processors; and
    performing, by the market model, via one or more hardware processors, one of:
    (i) maintaining at least one of a state, energy consumption, and energy supply of the transactive load in the distribution network if the MCP is less than or equal to the maximum demand, and
    (ii) facilitating change for one of the state, the energy consumption, and the energy supply of the transactive load in the distribution network, based on a pre-set logic, if the MCP is greater than the maximum demand,
    wherein the optimization function to obtain the MCP comprises:

$$\max \sum_n \left( \sum_j P_{nj}^t X\, D_{nj}^t - \sum_j C_{ni}^t X\, S_{ni}^t \right)$$

Such that:

$$0 \leq D_{nj}^t \leq D_{nj}^{t\,max} \forall n,j$$

$$0 \leq S_{nj}^t \leq S_{nj}^{t\,max} \forall n,j$$

$$\Sigma_n(\Sigma_j D_{nj}^t - \Sigma_j S_{ni}^t) = 0$$

$$\Sigma_n(\Sigma_j D_{nj}^t = \Sigma_{b \in B_n} f_b^t \forall n$$

$$f_b^{min} \leq f_b \leq f_b^{max}$$

$$t \in \{1,2,\ldots,24\}$$

Where,
n Number of nodes
i Number of steps in generation side bids
j Number of steps in generation side bids
$S_{ni}$ Bid of generator n at step i
$D_{nj}$ Bid of demand n at step j
$S_{ni}^{max}$ Maximum capacity limit of generator n at step i
$D_{ni}^{max}$ Maximum demand limit of generator n at step i
$f_{ni}^{max}$ Maximum demand limit of transmission line b
$f_{ni}^{min}$ Minimum capacity limit of transmission line b.

2. The method of claim 1, wherein the transactive energy environment comprises the at least one price responsive and transactive load and the one or more energy resources.

3. The method of claim 1, wherein the market model comprises a double auction market model.

4. A system for transactive energy market associated with a distribution network, comprising:
one or more memories; and
one or more hardware processors, the one or more memories coupled to the one or more hardware processors, wherein the one or more hardware processors are configured to execute programmed instructions stored in the one or more memories, to:
acquire, by a market model, a demand-side bid information associated with one or more demand-side bids and a supply side bid information associated with one or more supply side bids in form of price-quantity in real-time in a transactive energy environment, wherein a demand-side bid from amongst the one or more demand-side bids is acquired from at least one price responsive and transactive load in the distribution network, further wherein a supply-side bid from amongst the one or more supply-side bids is acquired from one or more energy resources for providing supply of electricity in the distribution network;
optimizing, by the market model, the demand side bid and the supply side bid using an optimization function to obtain a market clearing price (MCP) for the at least one price responsive and transactive load;
analyze, by a network simulation model, the MCP along with a network data to obtain a state information associated with the distribution network, wherein the network data comprises a total demand of the distribution network, generation in the distribution network and connectivity via distribution lines of each equipment of the distribution network, and wherein the state information of the distribution network comprises voltage information at different substations in the distribution network, loading information of the distribution lines, and information on active and reactive power consumption and losses;
determine, by the market model, whether the MCP of at least one participant of the plurality of market participants is greater than a maximum demand; and
perform, by the market model, one of:
(i) maintaining at least one of a state, energy consumption, and energy supply of the transactive load in the distribution network if the MCP is less than or equal to the maximum demand, and
(ii) facilitating change one of the state, the energy consumption, and the energy supply of the transactive load in the distribution network, based on a pre-set logic, if the MCP is greater than the maximum demand,
wherein the optimization function to obtain the MCP comprises:

$$\max \sum_n \left( \sum_j P^t_{nj} X\ D^t_{nj} - \sum_j C^t_{ni} X\ S^t_{ni} \right)$$

Such that:
$$0 \leq D_{nj}^t \leq D_{nj}^{t^{max}} \forall n,j$$
$$0 \leq S_{nj}^t \leq S_{nj}^{t^{max}} \forall n,j$$
$$\Sigma_n(\Sigma_j D_{nj}^t - \Sigma_j S_{ni}^t) = 0$$
$$\Sigma_n(\Sigma_j D_{nj}^t = \Sigma_{b \in B_n} f_b^t \forall n$$
$$f_b^{min} \leq f_b \leq f_b^{max}$$
$$t \in \{1,2,\ldots,24\}$$

Where,
n Number of nodes
i Number of steps in generation side bids
j Number of steps in generation side bids
$S_{ni}$ Bid of generator n at step i
$D_{nj}$ Bid of demand n at step j
$S_{ni}^{max}$ Maximum capacity limit of generator n at step i
$D_{ni}^{max}$ Maximum demand limit of generator n at step i
$f_{ni}^{max}$ Maximum demand limit of transmission line b
$f_{ni}^{min}$ Minimum capacity limit of transmission line b.

5. The system of claim 4, wherein the transactive energy environment comprises the at least one price responsive and transactive load and the one or more energy resources.

6. The system of claim 4, wherein the market model comprises a double auction market model.

7. One or more non-transitory machine readable information storage mediums comprising one or more instructions which when executed by one or more hardware processors cause a method for transactive energy market associated with a distribution network, the method comprising:
acquiring, by a market model, a demand-side bid information associated with one or more demand-side bids and a supply side bid information associated with one or more supply side bids in form of price-quantity in real-time in a transactive energy environment, wherein a demand-side bid from amongst the one or more demand-side bids is acquired from at least one price responsive and transactive load in the distribution network, further wherein a supply-side bid from amongst the one or more supply-side bids is acquired from one or more energy resources for providing supply of electricity in the distribution network;
optimizing, by the market model, the demand side bid and the supply side bid using an optimization function to obtain a market clearing price (MCP) for the at least one price responsive and transactive load; and
analyzing, by a network simulation model, the MCP along with a network data to obtain a state information associated with the distribution network, wherein the network data comprises a total demand of the distribution network, generation in the distribution network and connectivity via distribution lines of each equipment of the distribution network, and wherein the state information of the distribution network comprises voltage information at different substations in the distribution network, loading information of the distribution lines, and information on active and reactive power consumption and losses,
determining, by the market model, whether the MCP of at least one participant of the plurality of market participants is greater than a maximum demand; and
performing, by the market model, one of:
(i) maintaining at least one of a state, energy consumption, and energy supply of the transactive load in the distribution network if the MCP is less than or equal to the maximum demand, and
(ii) facilitating change one of the state, the energy consumption, and the energy supply of the transactive load in the distribution network, based on a pre-set logic, if the MCP is greater than the maximum demand, wherein the optimization function to obtain the MCP comprises:

$$\max \sum_n \left( \sum_j P_{nj}^t X\ D_{nj}^t - \sum_j C_{ni}^t X\ S_{ni}^t \right)$$

Such that:

$$0 \leq D_{nj}^t \leq D_{nj}^{t^{max}} \forall n,j$$

$$0 \leq S_{nj}^t \leq S_{nj}^{t^{max}} \forall n,j$$

$$\Sigma_n(\Sigma_j D_{nj}^t - \Sigma_j S_{ni}^t) = 0$$

$$\Sigma_n(\Sigma_j D_{nj}^t = \Sigma_{b \in B_n} f_b^t \forall n$$

$$f_b^{min} \leq f_b \leq f_b^{max}$$

$$t \in \{1,2,\ldots,24\}$$

Where,
n Number of nodes
i Number of steps in generation side bids
j Number of steps in generation side bids
$S_{ni}$ Bid of generator n at step i
$D_{nj}$ Bid of demand n at step j
$S_{ni}^{max}$ Maximum capacity limit of generator n at step i
$D_{ni}^{max}$ Maximum demand limit of generator n at step i
$f_{ni}^{max}$ Maximum demand limit of transmission line b
$f_{ni}^{min}$ Minimum capacity limit of transmission line b.

* * * * *